United States Patent Office 3,355,491
Patented Nov. 28, 1967

3,355,491
1,2-ETHYLENEBIS(AMINOGUANIDINES)
Earl Thomas Niles, Midland, Mich., and Erma G. Nosser, Concord, and Phyllis D. Oja, San Francisco, Calif., assignors to The Dow Chemical Company, Midland, Mich., a corporation of Delaware
No Drawing. Filed Sept. 9, 1965, Ser. No. 486,600
15 Claims. (Cl. 260—564)

This invention relates to high nitrogen organic compounds and more particularly is concerned with novel 1,2-ethylenebis(aminoguanidine) compounds corresponding to the structural formula $$\underset{M'}{\overset{M}{\diagdown}}N-\underset{H}{\overset{H}{\underset{|}{C}}}-\underset{H}{\overset{H}{\underset{|}{C}}}-N\underset{M'}{\overset{M}{\diagup}} \cdot nY$$

where M is either hydrogen (—H) or amino (—NH$_2$) and M' is $$-\overset{NH}{\overset{\|}{C}}NH_2 \quad -\overset{NH}{\overset{\|}{C}}NHNH_2 \quad -\overset{NNH_2}{\overset{\|}{C}}NHNH_2 \quad -NH\overset{NH}{\overset{\|}{C}}\diagdown_{NH_2} \quad -NH\overset{NH}{\overset{\|}{C}}NHNH_2$$

or $$-NH\overset{NNH_2}{\overset{\|}{C}}NHNH_2$$

and is further characterized in that when M is hydrogen, M' is $$-\overset{NH}{\overset{\|}{C}}NHNH_2 \quad -\overset{NNH_2}{\overset{\|}{C}}NHNH_2 \quad -NH\overset{NH}{\overset{\|}{C}}NHNH_2 \quad -NH\overset{NH}{\overset{\|}{C}}\diagdown_{NH_2}$$

or $$-NH\overset{NNH_2}{\overset{\|}{C}}NHNH_2$$

and when M is amino M' is $$-\overset{NH}{\overset{\|}{C}}NH_2 \quad -\overset{NH}{\overset{\|}{C}}NHNH_2$$

or $$-\overset{NNH_2}{\overset{\|}{C}}NHNH_2$$

Y is a mono-, di- or tribasic acid and n is an integer ranging from 1 to 4. Ordinarily Y is hydrochloric (HCl), hydrobromic (HBr), hydroiodic (HI), nitric (HNO$_3$), perchloric (HClO$_4$), chloric (HClO$_3$), sulfuric (H$_2$SO$_4$), hydrazoic (HN$_3$), phosphoric (H$_3$PO$_4$), carbonic (H$_2$CO$_3$)

or the like acids which usually are used to form the mono- or di-acid salt, i.e. where n is 1 or 2.

The present novel compounds are safe to handle and have both high N/C and high H/C ratios. These find a particular utility in the propellant industry as they undergo ready reaction with formaldehyde to produce polymeric high nitrogen containing propellant binder materials. Additionally the compounds can be used as curing agents for epoxy resins and the like materials and find utility as intermediates in the production of other new compounds. Because of their high N/C and H/C ratios, these monomers can be used as high energy additives and source materials for the generation of large volumes of gaseous driving fluids in gas producing and propellant compositions.

These novel monomers are crystalline, substantially colorless solids, having sharp, relatively high melting points, usually melting with decomposition. These readily can be purified by recrystallization from alcohol-water solvent systems. Depending on the substituent groupings, they range from low to high in water solubility. These monomers possess a characteristic infrared spectra consistent with their chemical structures and have characteristic peaks for the protons of the ethylene linkage as determined from the NMR spectra.

Ordinarily the present novel compounds are prepared by reacting an S-alkylisothiouronium salt compound with a 1,2-ethylenediamine or 1,2-ethylenedihydrazine. In practice, usually a solution or slurry of the alkylisothiouronium reactant is agitated and to this mixture slowly is added a water or an aliphatic alcohol solution of the -diamine or -hydrazine reactant. The reaction proceeds readily at room temperature, i.e. from about 18 to about 25° C., reaction temperatures of from about 0 to about 50° C. or more being operable. Since the reaction is slightly exothermic, initial heating of the reactants usually is not employed. Following completion of reactant mixing, the resulting product mixture ordinarily is allowed to stand for an extended period of time, i.e. several hours or more, usually with stirring or agitation. The crystalline product monomer is recovered from the product solution usually by fractional precipitation. Acidification of the product solution has been found to facilitate crystal formation. The novel compounds readily are purified by recrystallization from water or water-alcohol solutions.

The mole ratios of S-alkylisothiouronium compound and ethylenediamine or ethylenedihydrazine reactant to be employed range from about 0.8 to about 1.2 (S-alkylisothiouronium reactant/ethylenediamine or ethylenehydrazine) of that required stoichiometrically for preparation of the monomer.

The concentration of reactants in the reaction solutions can be varied. Ordinarily these range from about 1 to about 12 molar in concentration although more dilute or more concentrated solutions can be employed, if desired. The slurries should be of such a consistency that they can be readily handled during the processing.

The following examples will serve to further illustrate the present invention but are not meant to limit it thereto.

*Example 1.—N,N'-bis(diaminoguanidino)-1,2-ethylenediamine dihydroiodide*

About 18 grams of ethylenedihydrazine (~0.2 gram mole) in 50 milliliters of methanol was added slowly to a stirred slurry of about 109 grams (~0.44 gram mole) of S-methylisothiocarbohydrazonium hydroiodide in 500 milliliters of methanol. During the course of this addition, the temperature in the reaction mass rose from about 19 to about 32° C. The resulting product mixture was stirred for about 18 hours; methyl mercaptan which was liberated was trapped in sodium hydroxide solution. After this period, the product mixture was filtered. The filtrate (pH ~8) was acidified to pH 3 with 97% hydroiodic acid and refrigerated. A crystalline solid precipitated (25.4 grams). This was separated by filtration. The residual filtrate was concentrated and cooled yielding an additional 6.2 grams of the solid product. Both product fractions on the basis of infrared analysis were shown to be identical. The combined solid product was recrystallized four times from water yielding colorless crystals having a melting point of 183–184° C. (melting with decomposition). Elemental chemical anlysis of the product crystals gave C, 10.1%; H, 3.8%; N, 34.6%; I, 51.7%. Theoretical elemental analysis calculated for N,N' - bis(diaminoguanidino)-1,2-ethylenediamine dihydroiodide corresponding to the formula $$\begin{array}{c} \text{H} \\ \text{NH}_2\text{NCN} \\ \| \\ \text{NNH}_2 \end{array} \begin{array}{c} \text{H} \quad \text{H} \quad \text{H} \\ \text{N—C—C—N} \\ \text{H} \quad \text{H} \end{array} \begin{array}{c} \text{H} \\ \text{NCNNH}_2 \\ \| \\ \text{NNH}_2 \end{array} \cdot 2\text{HI}$$

is C, 9.8%; H, 4.1%; N, 34.3%; I, 51.8%.

The combined product yield was 32 percent.

The nuclear magnetic resonance spectrum and infrared spectra were consistent with the assigned structure.

A p-chlorobenzal derivative was prepared by reaction of the product with p-chlorobenzaldehyde. After recrystallization from benzene, this derivative exhibited a melting point of 198–200° C. (with decomposition). Elemental chemical analysis of the derivative gave C, 53.2%; H, 4.5%; N, 22.9%; Cl, 19.7%. Analysis calculated for the p-chlorobenzal derivative having the empirical formula $C_{32}H_{30}N_{12}Cl_4$ was C, 53.1%; H, 4.1%; N, 23.2%; Cl, 19.6%.

*Example 2.—N,N'-diamino-N,N'-bis(guanyl)- 1,2-ethylenediamine dihydrobromide*

About 18 grams of ethylenedihydrazine (~0.2 gram mole) in 40 milliliters methanol was added slowly at about 25° C. to a solution of 68.4 grams (~0.4 gram mole) of S-methylisothiouronium bromide in 80 milliliters of methanol. During this mixing, the temperature rose to about 39° C. The reaction mixture was allowed to stand for about 60 hours at ambient temperature, about 25° C., during which time colorless crystals precipitated in the reaction mass. These were separated by filtration and recrystallized from water. The resulting colorless crystals had a melting point of from about 299–301° C.

Elemental chemical analysis of the product crystals showed C, 14.0%; H, 4.4%; N, 32.6%; Br, 47.2%.

Theoretical elemental analysis calculated for N,N'-diamino-N,N'-bis(guanyl)-1,2-ethylenediamine dihydrobromide corresponding to the formula $$\begin{array}{c} \text{NH}_2 \\ \text{H}_2\text{N—C} \\ \| \\ \text{NH} \end{array} \begin{array}{c} \text{NH}_2 \quad \text{H} \quad \text{H} \quad \text{NH}_2 \\ \text{N—C—C—N} \\ \text{H} \quad \text{H} \end{array} \begin{array}{c} \text{NH}_2 \\ \text{C—NH}_2 \\ \| \\ \text{NH} \end{array} \cdot 2\text{HBr}$$

is C, 14.3%; H, 4.8%; N, 33.4%; Br, 47.5%.

The equivalent weight (weight in grams per gram equivalent weight of acid in the salt) was found to be 163. The thoretical calculated equivalent weight was 168.

Nuclear magnetic resonance spectrum and infrared spectra were consistent with the assigned structure.

Product yield was about 20 percent.

The residual filtrate remaining after removal of the N,N'-diamino-N,N'-bis(guanyl)-1,2-ethylenediamine dihydrobromide crystals from the reaction mass was concentrated substantially in vacuo to a syrupy consistency and the resulting syrup triturated with substantially anhydrous ethanol. Colorless crystals melting at 186–188° C. (with decomposition) were obtained.

Chemical elemental analysis of the product showed C, 14.9%; H, 4.7%; N, 33.6%; Br, 47.0%. Calculated theoretical analysis for N,N'-bis(guanidino)-1,2-ethylenediamine dihydrobromide corresponding to the structural formula $$\begin{array}{c} \text{NH} \\ \text{C—N—N—C—C—N—N—C} \\ \text{NH}_2 \quad \text{H} \quad \text{H} \quad \text{H} \quad \text{H} \quad \text{H} \quad \text{H} \end{array} \begin{array}{c} \text{NH} \\ \text{NH}_2 \end{array} \cdot 2\text{HBr}$$

is C, 14.3%; H, 4.8%; N, 33.4%; Br, 47.5%.

The equivalent weight was found to be 162; calculated theoretical equivalent weight was 168.

The nuclear magnetic resonance spectrum and the infrared spectra were consistent with the assigned structure.

Product yield was about 10 percent.

*Example 3.—N,N'-bis(aminoguanyl)-1,2-ethylenediamine dihydrobromide*

Over a 90 minute period, 30.6 grams (~0.5 gram mole) of 98 percent ethylenediamine was added to a slurry of 186.1 grams (1.0 gram mole) of S-methylisothiosemicarbazonium hydrobromide in 100 milliliters of water. During this addition, the temperature rose from about 25° C. to about 37° C. and rapid evolution of methyl mercaptan was observed. The resulting mixture was allowed to stand at ambient temperature for about 16 hours during which time colorless crystals formed from the reaction mass. These were separated by filtration, the residual filtrate concentrated and a second crop of crystals precipitated. The combined yield of product was washed with methanol and dried. The weight of the dried product was 77 g., equivalent to a 46 percent yield of N,N' - bis(aminoguanyl) - 1,2 - ethylenediamine dihydrobromide.

This compound melted at 248–250° C.

Elemental chemical analysis gave C, 14.6%; H, 4.6%; N, 33.5%; Br, 47.5%. The theoretical calculated elemental analysis for N,N'-bis(aminoguanyl)-1,2-ethylene diamine dihydrogen bromide corresponding to the formula $$\begin{array}{c} \text{H} \quad \text{H} \quad \text{H} \quad \text{H} \\ \text{H}_2\text{NHN—C} \\ \| \\ \text{NH} \end{array} \begin{array}{c} \text{N—C—C—N} \\ \text{H} \quad \text{H} \end{array} \begin{array}{c} \text{C—NHNH}_2 \\ \| \\ \text{NH} \end{array} \cdot 2\text{HBr}$$

is C, 14.3%; H, 4.8%; N, 33.4%; Br, 47.5%.

The benzal derivative was prepared by reaction of a sample of the product with benzaldehyde. This was recrystallized from absolute ethanol and dried. Its melting point was 223–225° C. (with decomposition). The elemental analysis gave C, 61.65%; H, 6.1%; N, 32.5%. Calculated theoretical analysis was C, 61.7%; H, 6.3%; N, 32.0%.

*Example 4.—N,N'-diamino-N,N'-bis(aminoguanyl)- 1,2-ethylenediamine hydrobromide*

Eethylenedihydrazine, 9 grams (~0.1 gram mole) dissolved in 20 milliliters of methanol was added to a slurry of 37.2 grams (~0.2 gram mole) of S-methylisothiosemicarbazonium bromide in 60 cubic centimeters of methanol. The temperature rose from 20 to about 35° C. during the addition. Methyl mercaptan was evolved, this being trapped in caustic solution. The resulting reaction mass was allowed to stand at ambient temperature for about 72 hours. Concentration of the product solution and separation of solid by-products produced a taffy-like material which was triturated with ethyl alcohol. Colorless crystals resulted; these, after recrystallization from water-isopropanol were found to melt at 222–224° C. (with decomposition). Chemical analysis gave C, 13.2%; H, 4.6%; N, 38.3%; Br, 43.9%.

The theoretical calculated analysis for N,N'-diamino-N,N'-bis(aminoguanyl)-1,2-ethylene diamine dihydrobromide of formula $$\begin{array}{c} \text{NH}_2 \quad \text{H} \quad \text{H} \quad \text{NH}_2 \\ \text{N—C—C—N} \\ \text{NH}_2\text{HN—C} \quad \text{H} \quad \text{H} \quad \text{C—NHNH}_2 \\ \| \quad \quad \quad \quad \quad \quad \quad \quad \quad \| \\ \text{NH} \quad \quad \quad \quad \quad \quad \quad \quad \text{NH} \end{array} \cdot 2\text{HBr}$$

is C, 13.1%; H, 4.9%; N, 38.4%; Br, 43.6%.

The calculated equivalent weight for this compound is 183. The equivalent weight found was 174.

Infrared spectra and nuclear magnetic resonance data fully supported the assigned structure.

A tetrabenzal derivative was formed as the free base. This, after recrystallization from ethanol, melted at 275–276° C. with decomposition. Elemental analysis of this derivative showed C, 69.0%; H, 6.0%; N, 24.1%. Theoretical calculated analysis for the derivative (empirical formula $C_{32}H_{32}N_{10}$) is C, 69.2%; H, 5.9%; N, 25.9%.

The dibenzal derivative also was prepared as the free base. This was in the form of colorless needles, melting at 273–274° C. with decomposition. Elemental analysis gave C, 70.15%; H, 6.10%; N, 23.4%. Theoretical calculated analysis for the dibenzal derivative is C, 70.1%; H, 5.9%; N, 24.0%.

*Example 5*

A number of other novel products were prepared utilizing the hereinbefore described novel dihydrobromide or dihydroiodide compounds as starting materials.

Salts with hydrazoic acid were made by neutralization of the free bases (prepared by contact of the bromide or iodide salts with a basic (—OH) ion exchange resin in water-alcohol solutions) with ether or aqueous solutions of the hydrazoic acid. These salts also were prepared by a metathasis reaction between the corresponding sulfate salt and sodium azide in alcohol solution.

The sulfate salts were prepared by reaction of the free bases with sulfuric acid.

Table I which follows presents a number of these novel compounds and lists their identifying characteristics.

We claim:
1. 1,2-ethylenebis(aminoguanidine) compounds corresponding to the formula

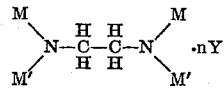

where M is either hydrogen or amino and M' is

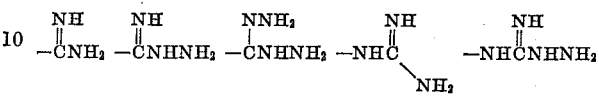

or

Y is a mono-, di- or tribasic acid and $n$ is an integer ranging from 1 to 4, said compound being further characterized in that when M is hydrogen, M' is

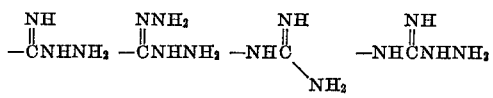

or

TABLE I

| Run No. | Compound | M.P., ° C. | Elemental Analysis (Percent) | | | | | | | |
|---|---|---|---|---|---|---|---|---|---|---|
| | | | C | | H | | N | | Anion | |
| | | | Calc. | Found | Calc. | Found | Calc. | Found | Calc. | Found |
| 1 | N,N'-bis(aminoguanyl)-1,2-ethylenediamine·2HN₃ | 161 | 18.5 | 18.4 | 6.2 | 6.2 | 73.3 | 75.7 | | |
| 2 | N,N'-bis(aminoguanyl)-1,2-ethylenediamine·2H₂SO₄ | 159 | 17.6 | 16.4 | 5.9 | 6.4 | 41.2 | 38.2 | 11.8 | [1]11.4 |
| 3 | N,N'-bis(aminoguanyl)-1,2-ethylenediamine·H₂SO₄ | 252–254 | 12.9 | 13.7 | 4.9 | 4.8 | 30.2 | 29.6 | 17.3 | [1]17.6 |
| 4 | N,N'-diamino-N,N'-bis(guanyl)-1,2-ethylenediamine·2HN₃ | [2](d)209–213 | 18.5 | 18.6 | 6.2 | 6.2 | 75.3 | 75.0 | | |
| 5 | N,N'-diamino-N,N'-bis(guanyl)-1,2-ethylenediamine·2H₂SO₄ | ≥300 | 17.6 | 17.7 | 5.9 | 5.9 | 41.4 | 41.0 | 11.8 | 12.0 |
| 6 | N,N'-bis(diaminoguanyl)-1,2-ethylenediamine·2HN₃ | 165.5 | 15.0 | 14.4 | 6.3 | 6.0 | 78.7 | 78.4 | | |

[1] ($SO_4^-$).  [2] (d)=decomposition.

The structure of these resultant products was supported by nuclear magnetic resonance spectrum, infrared spectra and by the elemental analysis.

*Example 6*

The dinitric acid salt of N,N' - bis(aminoguanyl) - 1,2-ethylenediamine was prepared either by reacting the corresponding dihydrazoic acid compound with nitric acid or by reacting the monosulfuric acid salt with sodium nitrate. Anhydrous methanol was used as the solvent in both preparations. The resulting colorless, crystalline product melted at 179–181° C. with decomposition.

Similarly, the diperchloric acid salt of this same substituted ethylenediamine was prepared by reacting the dihydrazoic acid compound with perchloric acid in anhydrous methanol. This colorless, crystalline material melted at 168–171° C. with decomposition.

The structure of both of these novel products was supported by nuclear magnetic resonance spectrum, infrared spectra and by elemental analysis.

In a manner similar to that described for the foregoing examples dihydrochloride, dichlorate, monocarbonic and dicarbonic acid, and phosphoric acid salts of the hereinbefore defined 1,2 - ethylenebis(aminoguanidine) compounds can be prepared.

Various modifications can be made in the present invention without departing from the spirit or scope thereof for it is understood that we limit ourselves only as defined in the appended claims.

and when M is amino M' is

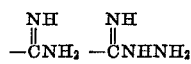

or

2. The compound as defined in claim 1 wherein Y is hydrochloric acid, hydrobromic acid, hydroiodic acid, nitric acid, perchloric acid, chloric acid, sulfuric acid, hydrazoic acid, phosphoric acid or carbonic acid and $n$ is either 1 or 2.

3. N,N'-bis(diaminoguanidino)-1,2-ethylenediamine dihydroiodide.

4. N,N'-diamino-N,N'-bis(guanyl)-1,2-ethylenediamine dihydrobromide.

5. N,N'-bis(guanidino)-1,2-ethylene dihydrobromide.

6. N,N'-bis(aminoguanyl)-1,2 - ethylenediamine dihydrobromide.

7. N,N'-diamino-N,N'-bis(aminoguanyl)-1,2 - ethylenediamine hydrobromide.

8. N,N'-bis(aminoguanyl)-1,2 - ethylenediamine·2HN₃.

9. N,N' - bis(aminoguanyl) - 1,2 - ethylenediamine ·2H₂SO₄.

10. N,N' - bis(aminoguanyl) - 1,2 - ethylenediamine ·H₂SO₄.

11. N,N' - bis(diaminoguanyl) - 1,2 - ethylenediamine · 2HN$_3$.

12. N,N' - bis(aminoguanyl) - 1,2 - ethylenediamine · 2HNO$_3$.

13. N,N' - bis(aminoguanyl) - 1,2 - ethylenediamine · 2HClO$_4$.

14. N,N' - diamino - N,N' - bis(guanyl) - 1,2-ethylenediamine · 2HN$_3$.

15. N,N' - diamino-N,N' - bis(guanyl) - 1,2 - ethylenediamine · 2H$_2$SO$_4$.

References Cited

UNITED STATES PATENTS 2,822,534  2/1958  Uraneck et al. _____ 260—583 XR
2,834,756  5/1958  Suen et al. _____ 260—72

CHARLES B. PARKER, *Primary Examiner.*

L. D. RUTLEDGE, *Examiner.*

L. A. SEBASTIAN, *Assistant Examiner.*